United States Patent [19]
Coates et al.

[11] Patent Number: 5,376,302
[45] Date of Patent: Dec. 27, 1994

[54] ELECTROOPTICAL LIQUID CRYSTAL SYSTEM

[75] Inventors: David Coates, Wimborn; Patrick Nolan; Shirley Marden, both of Poole, all of United Kingdom

[73] Assignee: Merck Patent Gesellschaft mit Beschrankter Haftung, Darmstadt, Germany

[21] Appl. No.: 42,762

[22] Filed: Apr. 6, 1993

[30] Foreign Application Priority Data

Apr. 6, 1992 [EP] European Pat. Off. ....... 92 105 920.0

[51] Int. Cl.$^5$ .......................... C09K 19/52; G02F 1/13
[52] U.S. Cl. ................... 252/299.01; 359/51; 359/52; 428/1
[58] Field of Search ............ 252/299.01; 428/1; 359/51, 52, 53

[56] References Cited

U.S. PATENT DOCUMENTS 4,688,900  8/1987  Doane et al. .................... 359/51
5,206,747  4/1993  Wiley et al. ..................... 359/51

FOREIGN PATENT DOCUMENTS 0272585  6/1988  European Pat. Off. .
89/06264  7/1989  WIPO .

Primary Examiner—Shean Wu
Attorney, Agent, or Firm—Millen, White, Zelano & Branigan

[57] ABSTRACT

The invention relates to an electrooptical liquid crystal system which between two electrode layers there is contained a liquid crystal mixture and a further optically transparent polymer medium, whose liquid crystal molecules have irregular orientation in the switched-off state, in which one of the refractive indices of the liquid crystal mixture is substantially the same as the refractive index of the medium $n_m$ and/or in which the quotient from the weight of the liquid crystal mixture and the weight of the optically transparent medium is 1.5 or more, which in one of the switching states has reduced transmission compared with the other state essentially independent of the polarization of the incident light, and whose liquid crystal mixture contains at least one dielectrically neutral and at least one dielectrically positive liquid crystalline or monotropic compound, characterized in that the liquid crystalline mixture contains less than 15% by weight of one or more dielectrically positive liquid crystalline, enantiotropic or monotropic, two-ring compounds in order to lower the solubility of the liquid crystal mixture in the medium.

25 Claims, No Drawings

ELECTROOPTICAL LIQUID CRYSTAL SYSTEM

BACKGROUND OF THE INVENTION

The invention relates to an electrooptical system
which between 2 electrode layers contains a liquid
crystal mixture and a further optically transparent
polymer medium,
whose liquid crystal molecules have an irregular
orientation in the switched-off state,
in which one of the refractive indices of the liquid
crystal mixture is substantially the same as the refractive index of the medium $n_m$ and/or in which
the quotient from the weight of the liquid crystal
mixture and the weight of the optically transparent
medium is 1.5 or more,
which in one of the switching states has reduced
transmission compared with the other state essentially independent of the polarization of the incident light, and
whose liquid crystal mixture contains at least one
dielectrically neutral and at least one dielectrically
positive liquid crystalline or monotropic compound.

Depending on the mass content of the liquid crystal mixture in the system, the liquid crystal mixture can be embedded in the optically transparent medium in liquid crystal microdroplets which are separated to a greater or lesser extent from one another or else form a more or less coherent, continuous phase in which the optically transparent medium is present, for example, in the form of particles. A continuous phase is also obtained, for example, if the optically transparent medium forms a sponge-like, 3-dimensional network whose pores, in which liquid crystal is located, merge into each other to a greater or lesser extent. The expression liquid crystal microdroplets here indicates small liquid crystal compartments separated from one another which, however, in no way have to have a spherical shape, but can be irregular shaped and/or deformed.

If the optically transparent medium contains liquid crystal microdroplets, wit is described in the following as a matrix; on the other hand, if a more or less continuous phase of the liquid crystal is present, the medium is described by the expression network.

NCAP and PDLC films (NCAP=nematic curvilinear aligned phases, PDLC=polymer dispersed liquid crystal) are examples of electrooptical liquid crystal systems in which the liquid crystal is embedded in the matrix in the form of microdrops. NCAP films are usually obtained by intimately mixing the encapsulated polymeric material, such as, for example, polyvinyl alcohol, the liquid crystal mixture and a carrier material, such as, for example, water, in a colloid mill. The carrier material is then removed, for example by drying. An appropriate process is described in U.S. Pat. No. 4,435,047. In contrast, the liquid crystal mixture is first homogeneously mixed with monomers or oligomers of the matrix-forming material in the preparation of PDLC films described, for example, in U.S. Pat. No. 4,688,900, Mol. Cryst. Liq. Cryst. Nonlin. Optic, 157, (1988), 427–441, WO 89/06264 and EP 0,272,585. The mixture is then polymerized and the phase separation is induced (so-called PIPS technology; polymerization-induced phase separation). In addition, differentiation must further be made between TIPS (temperature-induced phase separation) and SIPS (solvent-induced phase separation) (Mol. Cryst. Lyq. Cryst. Inc. Nonlin. Opt. 157 (1988) 427).

The PN system (PN=Polymer Network) described in EP 0,313,053 has a sponge-like network structure of the optically transparent medium. The content of the liquid crystal mixture in the material of the light-modulating layer is in general greater than 60% in systems of this type and is, in particular, between 70 and 90%. In order to prepare the PN systems, a mixture of the liquid crystal, monomers or oligomers of the material forming the 3-dimensional network and a polymerization initiator, in particular a photoinitiator, is customarily brought between 2 substrate plates provided with electrodes and then polymerized, for example by light irradiation.

The liquid crystal in general has a positive dielectric anisotropy $\Delta\epsilon$ and a relatively high optical anisotropy. In microdroplets matrix systems, one of the refractive indices of the liquid crystal, customarily the ordinary refractive index $n_O$ is selected in such a way that it more or less coincides with the refractive index $n_M (\equiv n_m)$ of the polymeric matrix. In the case of network systems, an adjustment of the refractive indices owing to the customarily very much higher liquid crystal content in the light-modulating layer is not absolutely necessary, but can be carried out to increase the light transmission and the contrast. An electrically switchable light scattering effect is observed in these electrooptical liquid crystal systems.

If no voltage is applied to the electrodes, between which the matrix or the network is customarily arranged like a sandwich, light incident on the statistically aligned liquid crystal molecules is strongly scattered and the system is non-transparent. On applying a voltage, the liquid crystal molecules are aligned parallel to the field and perpendicular to the E vector of the transmission light.

In the case of microdroplets matrix systems, perpendicularly incident light sees an optically isotropic medium when voltage is applied owing to the adjustment of $n_O$ and $n_M$ and the system appears transparent. An adjustment is necessary in order to avoid a scattering of the light at the matrix/liquid crystal droplets phase boundary. EP 0,272,585 describes another embodiment in which the refractive index $n_x$, which the liquid crystal exhibits at completely statistical orientation, is adjusted to the refractive index of the matrix $n_M$. In this case, the system is transparent in the field-free state, and it is converted into the opaque state by applying a voltage.

In the case of network systems, an adjustment of the refractive indices is not absolutely necessary, as owing to the high liquid crystal content in the material of the light-modulating layer, the scattering at the network-/liquid crystal phase boundary is obviously less strong. In the switched-on state, the system appears transparent even without adjustment of the refractive indices. In the case of network systems, the use of liquid crystals having high optical anisotropy is preferred to achieve a transmission which is as low as possible in the off-state.

In WO 89/09807, the use of an optically anisotropic, for example, liquid crystalline polymeric matrix material has been proposed in order to avoid the frequently observed clouding ("haze", in particular "off-axis haze") in the transparent state of the system. In systems of this type, the refractive indices of liquid crystal and optically anisotropic matrix can be adjusted to each other so that the transparent state is obtained either with the voltage applied or switched off.

Electrooptical liquid crystal systems according to the above description have been especially proposed for large-surface-area indicating systems, for architectural applications (windows, room dividers, sunroofs etc.) and for motor vehicles (windows, sunroofs etc.), these systems also being suitable for temperature regulation by virtue of controlled screening of the solar radiation. They can be switched on by applying a direct or alternating voltage.

As these systems are, in particular, also intended for "out-door" applications, liquid crystal mixtures are required which are characterized by a high clear point, high $\Delta\epsilon$, a broad nematic range, a favorable temperature dependence of the electrooptical parameters and a high stability to UV and temperature.

Examples of other applications are:
GH-indicating systems, the spectrum extending from simple segment displays to displays, to which it is possible to apply any desired electrode pattern using conventional printing techniques. Applications: motor vehicle, large displays, advertizing boards, clocks
displays having a high information content controlled by active or passive matrix
projection systems
switches A serious disadvantage of the conventional electrooptical systems described above is that the liquid crystal mixture or individual components of the liquid crystal mixture are, in many cases, distinguished by too high a solubility and/or too high a temperature dependence of solubility in the cured matrix-forming polymer.

If, for example, the solubility and/or the temperature-dependence of the solubility of one or several components differs quite significantly from that of the remaining components, it may happen that the physical properties of the mixture and in particular also of the refractive indices $n_e$ and $n_o$ are substantially affected, which disturbs the adjustment of $n_o$ or $n_e$ or another refractive index of the liquid crystal mixture to $n_M$, thus resulting in a considerable deterioration of the optical properties of the system. The incorporation of part of the liquid crystal mixture into the matrix furthermore leads to a reduction of contrast.

A high solubility of the liquid crystal mixture is especially disadvantageous in dyed electrooptical systems. The pleochroitic dye which is dissolved in the liquid crystal mixture, is incorporated into the cured polymer matrix which therefore exhibits a permanent and not an electrically switchable coloration.

The liquid crystal mixtures used hitherto only inadequately fulfill the requirements outlined above and, in particular, there is a great demand for electrooptical systems which are characterized by a low solubility of the liquid crystal mixture in the cured polymer matrix.

SUMMARY OF THE INVENTION

An object of the invention is to make available electrooptical liquid crystal systems and liquid crystals which do not have the disadvantages of conventional systems mentioned or only have them to a relatively small extent. Other objects of the present invention are immediately evident to the person skilled in the art from the following detailed description.

It has been found that these objects can be achieved if the liquid crystalline mixture contains less than 15% by weight of one or more dielectrically positive liquid crystalline, enantiotropic or monotropic, two-ring compounds.

The amount of the dielectrically positive two-ring component is preferably not less than 1%, especially 3% or more.

The invention thus relates to an electrooptical system
which between 2 electrode layers contains a liquid crystal mixture and a further optically transparent polymer medium,
whose liquid crystal molecules have irregular orientation in the switched-off state,
in which one of the refractive indices of the liquid crystal mixture is substantially the same as the refractive index of the medium $n_M$ and/or in which the quotient from the weight of the liquid crystal mixture and the weight of the optically transparent medium is 1.5 or more,
which in one of the switching states has reduced transmission compared with the other state essentially independent of the polarization of the incident light,
whose liquid crystal mixture contains at least one dielectrically neutral and at least one dielectrically positive liquid crystalline, enantiotropic or monotropic compound, characterized in that the liquid crystalline mixture contains less than 15% by weight of one or more dielectrically positive liquid crystalline, enantiotropic or monotropic, two-ring compounds in order to lower the solubility of the liquid crystal mixture in the medium.

The construction of the electrooptical liquid crystal systems according to the invention corresponds to the customary mode of construction for systems of this type. The term customary mode of construction is in this case broadly interpreted and includes all daptations and modifications.

Thus, for example, in the case of PDLC or NCAP films, the matrix formed by the transparent medium in which the liquid crystal mixture is microdispersed or microencapsulated is arranged between conducting electrodes like a sandwich.

The electrodes are applied, inter alia, to substrate sheets of, for example, glass, plastic or the like; if desired, however, the matrix can also be provided directly with electrodes so that the use of substrates can be avoided.

In the case of network systems, the liquid crystal is located in the pores of the sponge-like, 3-dimensional network or the optically transparent medium is located in the form of small, for example spherical, particles in the liquid crystal. The network is customarily arranged between substrates provided with electrodes in order to prevent escape of the liquid crystal.

Both network systems and microdroplets matrix systems can be operated reflectively or transmissively so that at least one electrode and, if present, the associated substrate are transparent. Both systems customarily contain no polarizers, as a result of which a distinctly higher light transmission results. Furthermore, no orientation layers are necessary, which is a considerable technological simplification in the production of these systems compared with conventional liquid crystal systems such as, for example, TN or STN cells.

The matrix or the 3-dimensional network are based, in particular, on isotropic thermoplastics, thermoset plastics and elastomers. Depending on the intended application, the systems obtained can be flexible, elastic or rigid.

A system based on a thermoplastic polymer can easily be deformed by the action of a mechanical stress at temperatures which are greater than the glass temperature of the matrix. This can be used, for example, in microdroplets matrix systems in order to freeze a specifically deformed shape of the droplets by cooling the matrix to temperatures below the glass temperature. Furthermore, for example, the matrix can be mechanically stretched at temperatures above the glass temperature or orientated by the action of electrical or magnetic fields, this orientation, which is maintained at temperatures below the glass temperature, causing optically anisotropic properties of the matrix.

While flexible and/or elastic systems are preferably based on thermoplastics and/or elastomers, thermoset polymers are preferably used for the production of rigid systems. These can be deformed mechanically, for example, during hardening, the shape and arrangement of the microdroplets, for example, being fixed in the hardened matrix.

In the literature, there are various details about materials particularly suitable for the production of the matrix or of the network. Thus, for example, in U.S. Pat. No. 4,435,047 or in Liquid Crystals 3, (1988) 1543, water-soluble polymers are proposed, such as, for example, polyvinyl alcohol PVA or latex-like emulsions. In U.S. Pat. Nos. 4,672,618, 4,673,255, 4,688,900, WO 85/04262 and in Mol. Cryst. Liq. Cryst. Inc. Nonlin. Opt. 157 (1988) 427, on the other hand synthetic resins such as, for example, epoxy resins and polyurethanes which, for example, are thermally cured, are mentioned as suitable matrix materials. EP 0,272,585 describes matrix or network materials based on photocurable vinyl compounds and WO 89/06264 proposes copolymers of multifunctional acrylates and multifunctional mercaptans. Other details about polymers which are suitable, in particular, for matrix systems are found, for example, in EP 0,165,063, EP 0,345,029, EP 0,357,234 or EP 0,205,261.

For the production of network systems, a number of 3-dimensional crosslinkable monomers such as, for example, di- and triacrylates are mentioned in EP 0,313,053.

In addition, however, other transparent materials such as, for example, inorganic oxide glass monoliths (U.S. Pat. No. 4,814,211), other inorganic materials (see, for example, Japanese Laid-Open Specification 303325/1988) or, alternatively, other materials can also be used for matrix and network systems.

The materials mentioned are intended to illustrate the invention only by way of example, but should in no case limit it. In principle, all transparent materials can be used which permit the production of the matrix or network structures described above.

Preferred embodiments of the electrooptical liquid crystal systems according to the invention are NCAP films, PDLC films and microdroplets matrix systems produced by modified processes. Processes for the production of these films are described, for example, in U.S. Pat. Nos. 4,688,900, 4,673,255, 4,671,618, WO 85/0426, U.S. Pat. No. 4,435,047, EP 0,272,595, Mol. Cryst. Liq. Cryst. Inc. Nonlin. Opt. 157 (1988) 427, Liquid Crystals, 3 (1988) 1543, EP 0,165,063, EP 0,345,029, EP 0,357,234 and EP 0,205,261.

A further preferred embodiment of the electrooptical systems according to the invention are the network systems whose production is described in EP 0,313,053. Included in the network systems here are also arrangements in which the transparent medium is dispersed in the form of individual, for example spherical, particles in the liquid crystal, such as is described, for example, in GB 1,442,360.

However, in addition also those embodiments of the invention are included in which the transparent medium has a structure which lies between the network structure, on the one side, and the microdroplets matrix configuration, on the other side.

In addition, other embodiments of the invention not explicitly mentioned here are also included. The thickness of the electrooptical systems, d, is customarily chosen to be small in order to achieve a threshold voltage $V_{th}$ which is as low as possible. Thus, for example, layer thicknesses of 0.8 and 1.6 mm are reported in U.S. Pat. No. 4,435,047, while values for the layer thickness between 10 $\mu$m and 300 $\mu$m are given in U.S. Pat. No. 4,688,900 and between 5 $\mu$m and 30 $\mu$m in EP 0,313,053. The electrooptical systems according to the invention only have layer thicknesses d which are distinctly greater than a few mm in exceptional cases; layer thicknesses d$\leq$2 nun are preferred.

The threshold voltage is also influenced by the size of the microdroplets or the mesh width of the network. Generally, relatively small microdroplets cause a relatively high threshold voltage $V_{th}$, but relatively short switch times $t_{on}$ or $t_{off}$(U.S. Pat. No. 4,673,255). Experimental methods for influencing the average droplet size are described, for example, in U.S. Pat. No. 4,673,255 and in J. L. West, Mol. Cryst. Liq. Cryst. Inc. Nonlin. Opt., 157 (1988) 427. In U.S. Pat. No. 4,673,255, average drop diameters between 0.1 $\mu$m and 8 $\mu$m are given, while, for example, a matrix which is based on a glass monolith has pores having a diameter between 15 and 2,000 Å. For the mesh width of the network of the PN systems, a preferred range between 0.5 and 2 $\mu$m is given in EP 0,313,053.

An essential difference between the electrooptical liquid crystal systems according to the invention and those customary hitherto exists, however, in the liquid crystal mixture used.

It was found that the solubility of the liquid crystal mixture in the cured polymer matrix or polymer network can drastically be reduced if the liquid crystal mixture contains less than 15% by weight of one or more dielectrically positive liquid crystalline, enantiotropic or monotropic, two-ring compounds.

The following Table I compares the composition of the liquid crystalline mixture E 7 (available through Merck Ltd., GB) and the liquid crystalline mixture E 7-1 which has been extracted from a PDLC system of a mixture of E 7 and the prepolymer system NOA 65 (available through Norland Products) in a mass ratio of 3:2. The mixture of E 7 and NOA 65 was filled between two acetate sheets and cured with a medium pressure xenon lamp (Heraeus Suntest, 3 mW/cm$^2$) for 20 minutes. The liquid crystal mixture was extracted by squeezing the PDLC film with a roll, and the liquid crystal mixture obtained, which is termed E 7-1, was analyzed by gas chromatography.

The following abbreviations are used in Table I:

TABLE I

| Composition of E 7 and E 7-1 | | |
|---|---|---|
| Compound | E 7 | E 7-1 |
| K 15 | 51% | 45.0% |

TABLE I-continued

| Composition of E 7 and E 7-1 | | |
|---|---|---|
| Compound | E 7 | E 7-1 |
| K 21 | 25% | 26.2% |
| M 24 | 16% | 18.7% |
| T 15 | 8% | 10.1% |

K 15  4-pentyl-4'-cyanobiphenyl
K 21  4-heptyl-4'-cyanobiphenyl
M 24  4-octoxy-4'-cyanobiphenyl
T 15  4-pentyl-4'-cyanoterphenyl It can be seen from Table I that in E 7-1, the lowest molecular weight compound, K 15, is of considerably lower concentration than in the original mixture, E 7 (decrease by 11.8% with respect to the percentage of K 15 in E 7), while the most significant increase in concentration is found for the highest molecular weight compound T 15 (increase by 26.3% with respect to the percentage of T 15 in E 7). An increase is also found for K 21 (+4.8%) and M 24 (+12,9) which is, however, due to the strong absolute decrease of K 15.

Table II summarizes the results of soaking experiments which were performed by exposing a cured NOA 65 film to the respective liquid crystalline compound or liquid crystalline mixture. The liquid crystal material incorporated into the polymer matrix acts as an isotropic material with the refractive index given via $$\bar{n}^2 = \tfrac{1}{3}(n^2_e + 2n^2_o)$$

The overall refractive index of the soaked NOA 65 film therefore is given by $$\overset{*}{n}_{NOA65} = x\,\bar{n} + (1-x)n_{NOA65}$$

with x being the percentage of the incorporated liquid crystal material with respect to the mass of the soaked NOA 65 film, $n_{NOA65}$ is the refractive index of the original and $\overset{*}{n}_{NOA65}$ of the soaked NOA 65 film.

Thus, x can be obtained by measuring $n_{NOA65}$.

The following abbreviations are used in Table II:

TABLE II

| | Liquid crystal material | x |
|---|---|---|
| two-ring materials | K 15 | 19.74% |
| | K 18 | 17.46% |
| | PCH-5F | 17.16% |
| | PCH-3Cl | 27.00% |
| | PCH$_{eu}$ | 19.54% |
| | M$_{eu}$ | 15.40% |
| three-ring materials | FET-15 | 1.57% |
| | FET$_{eu}$ | 3.20% |

K 15  4-pentyl-4'-cyanobiphenyl
K 18  4-hexyl-4'-cyanobiphenyl
PCH-5F  4-(trans-4-pentylcyclohexyl)-1-fluorobenzene
PCH-3Cl  4-(trans-4-propylcyclohexyl)-1-chlorobenzene
FET-15  1-(2-fluoro-4-pentyl-biphenyl-4'-yl)-2-(4-cyanophenyl)-ethane
PCH$_{eu}$ is
24.5% of 4-(trans-4-ethylcyclohexyl)-benzonitrile
23.1% of 4-(trans-4-propylcyclohexyl)-benzonitrile
23.6% of 4-(trans-4-butylcyclohexyl)-benzonitrile
28.8% of 4-(trans-4-pentylcyclohexyl)-benzonitrile
M$_{eu}$ is an eutectic mixture consisting of
17.5% of 4-propoxy-4-cyanobiphenyl
15.0% of 4-butoxy-4-cyanobiphenyl
4.0% of 4-pentoxy-4-cyanobiphenyl
22.0% of 4-hexoxy-4-cyanobiphenyl
21.0% of 4-heptoxy-4-cyanobiphenyl
20.5% of 4-octoxy-4-cyanobiphenyl
and FET$_{eu}$ is an eutectic mixture consisting of
39.6% of 1-(2-fluoro-4-ethyl-biphenyl-4'-yl)2-(4-chlorophenyl)-ethane
20.1% of 1-(2-fluoro-4-propyl-biphenyl-4'-yl)2-(4-chlorophenyl)-ethane
40.3% of 1-(2-fluoro-4-pentyl-biphenyl-4'-yl)2-(4-chlorophenyl)-ethane It can be concluded from table II that mesogenic compounds with 2 rings exhibit a considerably higher solubility in a cured NOA 65 matrix than mesogenic 3 ring compounds.

Table III summarizes some important physical properties of E 7 and E 7-1. The decrease of the percentage of the 2-ring compounds results in an increase of the clearing temperature N-I and a rather slight increase of the ordinary index of refraction $n_o$ and the birefringence $\Delta n$. Dissolving a part of the liquid crystal mixture in the cured NOA 65 matrix leads on the other hand to a considerable increase of the refractive index of the NOA 65 matrix which originally amounts to $n_{NOA65} = 1.528$.

TABLE III

| Physical Properties of E 7 and E 7-1 | | |
|---|---|---|
| | E 7 | E 7-1 |
| N-I | 61° C. | 65.6° C. |
| $n_o$ | 1.521 | 1.524 |
| $\Delta n$ | 0.224 | 0.228 |

Assuming that 20% of E 7 are being dissolved in the matrix gives a refractive index of $\overset{*}{n}_{NOA65} = 0.2 \times 1.599 + 0.8 \times 1.528 = 1.542$, with n of E 7 being 1.599.

Thus there is a considerable mismatch between the refractive indices of the NOA 65 matrix containing dissolved liquid crystal material and the liquid crystal mixture in the micro-droplets. A PDLC film obtained by curing a mixture of E 7 and NOA 65 in a mass ratio of 3:2 exhibits a transmission in the on-state of typically about 75% while theoretically 91% should be possible.

The situation is sometimes even worse because not only the liquid crystal mixture partly dissolves in the polymer matrix but the precursor of the polymer matrix sometimes also partly dissolves in the liquid-crystal mixture. This effect often results in an additional decrease of $n_o$ and $\Delta n$ of the liquid crystalline mixture and thus in an increase of the mismatch of refractive indices.

The present inventors concluded from the experiment reported above and from further extensive experimental investigations that electrooptical systems with a reduced solubility of the liquid crystal mixture in the polymer matrix can be obtained, if the liquid crystalline mixture contains less than 15% by weight of one or more dielectrically positive liquid crystal-line, line, enantiotropic or monotropic, two-ring compounds. It was further found out that these electrooptical systems are characterized by an advantageous solubility of the precursor of the polymer matrix in the liquid crystal mixture.

In the following, for the sake of simplicity, the following abbreviations are used:

| | |
|---|---|
| Cyc | trans-1,4-cyclohexylene |
| Phe | 1,4-phenylene |
| Phe.2F | 2-fluoro-1,4-phenylene |
| Phe.3F | 3-fluoro-1,4-phenylene |
| Phe.2F3F | 2,3-difluoro-1,4-phenylene |
| Phe.2F6F | 2,6-difluoro-1,4-phenylene |

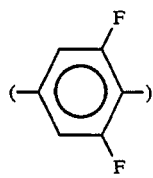

-continued

Phe.2F3F6F 2,3,6-trifluoro-1,4-phenylene 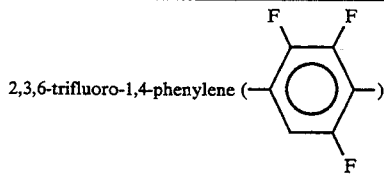

| Phe. (F) | 1,4-phenylene which may be unsubstituted or substituted by 1, 2 or 3 F atoms |
|---|---|
| Pyr | pyrimidine-2,5-diyl |
| Pyd | pyridine-2,5-diyl |
| Dio | 1,3-dioxane-2,5-diyl |

Pyr, Pyd and Dio comprise all positional isomers.

The dielectrically positive liquid crystalline or monotropic two-ring compounds are preferably selected from the group of compounds of formula I

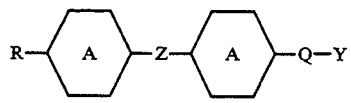　　　I wherein

R is an alkyl group with 1–15 C atoms wherein one or more non-adjacent $CH_2$-groups can be replaced by —O—, —CO—, —COO—, —OCO—, —S— or —CH=CH—, Z is —$CH_2CH_2$—, —COO—, —OCO—, —C≡C— or a single bond, Q is $CF_2$, $OCF_2$, $C_2F_4$, $OC_2F_4$ or a single bond, Y is H, Cl, F or CN and

are, independently of one another, Cyc, Phe(F) (e.g., Phe, Phe.2F, Phe.3F, Phe.2F6F, and Phe.2F3F6F), Pyr, Pyd or Dio.

If R in the compounds of formula I is an alkyl or an alkoxy radical, it can be straight-chain or branched. Preferably, it is straight-chain and exhibits more than 3, especially not less than 5, and in particular at least 6, C atoms and is, therefore, preferably propyl, butyl, pentyl, hexyl, octyl, nonyl, decyl, undecyl, dodecyl, propoxy, butoxy, pentoxy, hexoxy, heptoxy, octocy, nonoxy, decoxy, undecoxy, dodecoxy, further ethyl or ethoxy. Oxaalkyl is preferably straight chain 2-(=ethoxymethyl) or 3-oxabutyl (=2-methoxyethyl), 2-, 3- or 4-oxapentyl, 2-, 3-, 4- or 5-oxahexyl 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If R is an alkenyl group it is preferably straight-chain and has 3 to 10, in particular 4 to 10 atoms. It is, therefore, preferably prop-1- or prop-2-enyl, but-1-, 2- or but-3-enyl, pent-1-, 2-, 3- or pent-4-enyl, hex-1-,2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred is the following smaller group of dielectrically positive 2-ring compounds:

R-Cyc-Z-Cyc-Q-Y
R-Cyc-Z -Phe-Q-Y
R-Cyc-Z-Phe.2F-Q-Y
R-Cyc-Z-Phe.3F-Q-Y
R-Cyc-Z-Phe.2F6F-Q-Y
R-Cyc-Z-Phe.2F3F6F-Q-Y
R-Phe-Z-Phe-Q-Y
R-Phe.2F-Z-Phe-Q-Y
R-Phe.3F-Z-Phe-Q-Y
R-Phe.2F6F-Z-Phe-Q-Y
R-Phe.(F)-Z-Phe.(F)-Q-Y
R-Pyr-Z-Phe.(F)-CN
R-Pyd-Z-Phe.(F)-CN

In this smaller group of preferred compounds, Z preferably is —$CH_2CH_2$—, —COO—, —OCO— or a single bond and, in particular, —$CH_2CH_2$—, —COO— or a single bond.

The compounds of formula I can roughly be divided into carbonitriles (Q=single bond, Y=CN) and SFM-compounds (superfluorinated materials, Q=$CF_2$, $OCF_2$, $C_2F_4$ or a single bond, Y=H, Cl or F).

In the case where the dielectrically positive two-ring component is based on carbonitriles, it preferably contains one or more, and in particular at least two, positive two-ring compounds, and the percentage of the two-ring component with respect to the total mass of the liquid crystal mixture is about 3–15%, and in particular 5–15%. It is often desirable that at least one of these two-ring carbonitriles contains an alkoxy terminal group with 5 or more C atoms.

In the case where the dielectrically positive two-ring component is based on SFM compounds, it preferably contains one or more, and in particular at least two, dielectrically positive two-ring compounds, and the percentage of the dielectrically positive two-ring component preferably is about 7.5–15% with respect to the total mass of the liquid crystal mixture. Q-Y preferably denotes —F, —Cl, —$CF_3$ or —$OCF_3$ and, in particular, F, Cl or $OCF_3$.

The term "based on" used above is to say that the percentage of the respective compounds with respect to the total mass of the dielectrically positive two-ring component is not less than about 60%.

The liquid crystalline mixture used in the electrooptical systems according to the present invention, preferably contains in addition to the dielectrically positive 2-ring component which in the following will be termed as component A, a dielectrically neutral component B containing more than 25% by weight, with respect to the mass of the liquid crystal mixture, of one or more dielectrically neutral 2-, 3- or 4-ring compounds. The dielectrically neutral compounds are preferably chosen from the group of compounds according to formula II

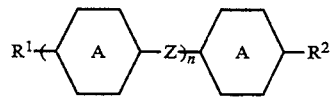　　　II n is 1, 2 or 3;

$R^1$ and $R^2$ in each case, independently of one another, have the meanings given above for R; and

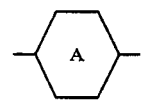

and Z in each case, independently of one another, have the meanings given for

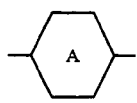

and Z, respectively.

If $R^1$ and/or $R^2$ are an alkyl radical and/or an alkoxy radical, they can be straight-chain or branched. Preferably, the alkyl or alkoxy radical is straight-chain; has 1, 2, 3, 4, 5, 6, or 7 C atoms; and is, therefore, preferably, methyl, ethyl, propyl, butyl, pentyl hexyl, heptyl, methoxy, ethoxy, propoxy, butoxy, pentoxy, hexoxy or heptoxy, or further methyl, octyl, nonyl, decyl, undecyl, dodecyl, octoxy, nonoxy, decoxy, undecoxy or dodecoxy. Oxyalkyl is preferably straight-chain 2-oxypropyl (=methoxymethyl, 2- (=ethoxymethyl or 3- oxabutyl (=2-methoxyethyl, 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7 or 8-oxanonyl, 2-, 3-, 4-, 5-, 6-, 7-, 8- or 9-oxadecyl. If $R^1$ and/or $R^2$ are an alkyl radical in which a $CH_2$ group is replaced by —CH=CH—, they can be straight-chain or branched. Preferably, such a radical is straight-chain and has 2–10 C atoms and is, therefore, preferably vinyl, prop-1 or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4 -, 5-, 6-, 7 or non-8-enyl, dec-1-, 2-, 3-, 4-, 5-, 6-, 7-, 8- or dec-9-enyl.

In the compounds of the formula II the radicals $R^1$ and/or $R^2$ can be straight-chain or branched, however, they are preferably straight-chain. Compounds of the formula II having branched alkyl or alkoxy radicals can occasionally be of importance owing to a better solubility in the customary liquid-crystalline base materials, but in particular as chiral dopants if they are optically active. Branched groups of this type as a rule contain not more than one chain branching. Preferred branched radicals are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 2-methylhexoxy, 2-octyloxy, 2-oxa-3-methylbutyl, 3-oxa-4 -methylpentyl, 4 -methylhexyl, 2-nonyl, 6-methyloctoxy, 2-methyl-3-oxapentyl and 2-methyl-3-oxahexyl.

The following smaller group of dielectrically neutral 2-ring compounds is especially preferred:
$R^1$-Cyc-Z-Phe-$R^2$
$R^1$-Cyc-Z-Phe.2F-$R^2$
$R^1$-Cyc-Z-Phe.3F-$R^2$
$R^1$-Cyc-Z-Phe.2F3F -$R^2$
$R^1$-Cyc-Z-Phe.2F3F6F-$R^2$
$R^1$-Phe-Z-Phe-$R^2$
$R^1$-Phe.2F-Z-Phe-$R^2$
$R^1$-Phe.3F-Z-Phe-$R^2$
$R^1$-Phe.2F-Z-Phe.2F-$R^2$
$R^1$-Phe.2F-Z-Phe.3F-$R^2$
$R^1$-Phe.2F6F-Z -Phe.2F-$R^2$
$R^1$-Cyc-Z-Cyc-$R^2$
$R^1$-Dio-Z-Cyc-$R^2$ In this smaller group of dielectrically neutral 2-ring compounds
Z preferably is a single bond, —COO—, —OCO— or —$CH_2CH_2$—.

Also preferred is the following smaller group of dielectrically neutral 3-ring compounds:
$R^1$-Cyc-Cyc-Z-Phe-$R^2$
$R^1$-Cyc-Cyc-Z-Phe.2F-$R^2$
$R^1$-Cyc-Cyc-Z-Phe.3F-$R^2$
$R^1$-Cyc-Cyc-Z-Phe.2F3F-$R^2$
$R^1$-Cyc-Phe.(F)-Z-Phe-$R^2$
$R^1$-Cyc-Phe.(F)-Z-Phe-2F-$R^2$
$R^1$-Cyc-Phe.(F)-Z-Phe.3F-$R^2$
$R^1$-Cyc-Z-Phe-Phe-$R^2$
$R^1$-Cyc-Z-Phe.2F-Phe-$R^2$
$R^1$-Cyc-Z-Phe.3F-Phe-$R^2$
$R^1$-Cyc-Z-Phe.2F-Phe.2F-$R^2$
$R^1$-Cyc-Z-Phe.2F-Phe.3F-$R^2$
$R^1$-Cyc-Z-Phe-Phe.2F-$R^2$
$R^1$-Cyc-Z-Phe-Phe.3F-$R^2$
$R^1$-Cyc-Z-Phe.(F)—COO—Phe.(F)-$R^2$
$R^1$-Phe—COO—Phe.(F)-Z-Phe.(F)-$R^2$
$R^1$-Phe.(F)-Phe.(F)-Phe-$R^2$
$R^1$-Phe.2F-Z-Phe.F-Phe-$R^2$
$R^1$-Phe.3F-Z-Phe.F-Phe-$R^2$
$R^1$-Phe.2F-Z-Phe.2F-Z-Phe-$R^2$
$R^l$-Phe.2F-Z-Phe.3F-Z-Phe-$R^2$
$R^1$-Cyc-Cyc-Z-Cyc-$R^2$
$R^1$-Cyc-Phe.(F)-Z-Cyc-$R^2$ With respect to this list, in dielectrically neutral 3-ring compounds with 2 Z groups, at least one of those preferably is a single bond; in compounds with one Z group, Z preferably is a single bond or —$CH_2$—$CH_2$—.

Also preferred is the following smaller group of dielectrically neutral compounds with 4 rings:
$R^1$-Cyc-Z-Phe.(F)-Z-Phe.(F)-Cyc-$R^2$
$R^1$-Cyc-Cyc-Z-Phe.(F)-Phe.(F)-$R^2$
$R^1$-Cyc-Cyc-Cyc-Z-Phe.(F)-$R^2$
$R^1$-Cyc-Cyc-Z-Cyc-Cyc-$R^2$ Electrooptical system according to the present invention the liquid mixture of which contains
  less than 15% of a component A consisting of one or more dielectrically positive 2-ring compounds, and
  at least 25% of a component B consisting of one or more dielectrically neutral 2-, 3- or 4-ring compounds according to formula II and, in particular, according to the preferred subformulae
exhibit advantageous properties and, in particular, a low solubility of the liquid crystal mixture in the cured polymer matrix. The dielectrically neutral component B-preferably contains at least 2 and, in particular, not less than 3 compounds. Component D preferably contains at least one 2-ring and at least one 3-ring compound. The percentage of component B with respect to the mass of the liquid crystal mixture preferably is at least 25% and, in particular, at least 30%.

The liquid crystal mixture used in the electrooptical system according to the present invention, preferably contains in addition to components A and B described above a further component C containing one or more dielectrically positive liquid crystalline, enantiotropic or monotropic compounds containing 3 or more rings. The percentage of component C in the liquid crystal mixture preferably is not less than 25% and, in particular, at least 27.5%.

The liquid crystalline compounds of component C are preferably selected from the group of compounds of formula III

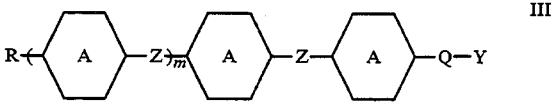

wherein
m is 1 or 2, and

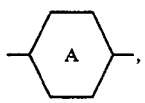

Z, Q and Y in each case independently from one another, have the meaning indicated above.

Especially preferred is the following smaller group of dielectrically positive compounds with 3 rings.

R¹-Cyc-Cyc-Z-Phe.(F)-Q-Y
R¹-Cyc-Phe.(F)-Z-Phe.(F)-Q-Y
R¹-Phe-Z-Phe.(F)-Z-Phe.(F)-Q-Y

In these compounds R preferable has one of the meanings given above. Z preferably is a single bond, —CH₂CH₂—, —COO— or —OCO—and, in particular, a single bond or —CH₂CH₂—.

Electrooptical systems according to the present invention the liquid crystal mixture of which contains less than 15% of a component A consisting of one or more dielectrically positive 2-ring compounds exhibit favorable properties. They are characterized by a low solubility of the liquid crystal mixture in the cured matrix which considerably facilitates index matching and results in improved overall electrooptical properties like, for example, improved contrast and on-state clarity. The electrooptical systems according to the present invention are furthermore quite generally characterized by a low solubility of the precursor of the polymer matrix in the liquid crystal mixture.

The advantageous properties of the electrooptical systems according to the present invention are usually even more pronounced if a further component B and/or further component C is added. Component B comprises one or more dielectrically neutral compounds with 2, 3 or 4 rings, and component C comprises one more dielectrically positive compounds with 3 or 4 rings. The liquid crystal mixtures used in the electrooptical systems according to the present invention preferably contain more than 3 and in particular, between 5 and 30 compounds. The overall percentage of 2-ring compounds of component A and B preferably is higher than 25%.

Especially preferred is the use of a liquid crystalline mixture containing less than 15% of component A, more than 25% of component B and/or at least 20% of component C.

The compounds of formulae I, II and III are prepared by methods known per se, such as are described in the literature (for example in the standard works such as Houben-Weyl, Methoden der Organischen Chemie (Methods of Organic Chemistry, Georg-Thieme-Verlag, Stuttgart, Vol. IX, p. 867 et seq.), in particular under reaction conditions which are known and suitable for the reactions.

The liquid crystal mixture used in the electrooptical systems according to the present invention preferably contains a dye component D comprising one or more pleochroic dyes. Because of the low solubility of the liquid crystal mixture in the cured matrix, the dye molecules have no or only very little tendency to dissolve in the matrix. The color of the electrooptical system is therefore electrically fully switchable, and not between a more or less pronounced intensity of the color as is the case with most conventional dyed systems. Especially preferred are azo dyes like, for example, azo dye F 593 (available through E. Merck, Germany) and anthraquinone dyes like, for example, anthraquinone dyes D 80, D 82 (available through ICI), or B 3 (available through Hofmann LaRoche, Switzerland). The dye classes and specific examples of dyes, mentioned here, are to be understood as merely illustrative and not restricting the scope of the present invention. Other suitable dyes can be found, for example, in H. Kelker and R. Hatz, Handbook of Liquid Crystals, Verlag Chemie, Weinheim. Electrooptical systems according to the present invention in which pleochroitic dyes are added to the liquid crystal mixture in a percent by weight range of 0.1-20% and, in particular, 0.2-10% with respect to the mass of the livid crystal mixture, are preferred.

In the case of dyed electrooptical systems according to the present invention, the precursor of the polymer matrix preferably is cured thermally. Curing by UV-irradiation is less preferable.

Percentage data given above and below are in each case percentages by weight.

The entire disclosures of all applications, patents, and publications, cited herein, and of corresponding European Application No. 92105920.0, filed Apr. 6, 1992, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

We claim:

1. In an electrooptical liquid crystal system comprising two electrode layers between which is a liquid crystal mixture and a further optically transparent polymer medium, wherein:

the liquid crystal molecules of said mixture have irregular orientation in the switched-off state,
one of the refractive indices of the liquid crystal mixture is substantially the same as the refractive index of the polymer medium and/or the quotient of the weight of the liquid crystal mixture and the weight of the optically transparent medium is 1.5 or more,
one of the switching states has reduced transmission compared with the other state essentially independent of polarization of incident light, and
said liquid crystal mixture contains at least one dielectrically neutral and at least one dielectrically positive liquid crystalline, enantiotropic or monotropic, compound,
the improvement wherein said liquid crystal mixture contains one or more dielectrically positive liquid crystalline, enantiotropic or monotropic, two-ring compounds to lower the solubility of the liquid crystal mixture in said medium, the amount of said dielectrically positive liquid crystalline, enantiotropic or monotropic, two-ring compounds being less than 15% by weight.

2. A system according to claim 1, wherein said liquid crystal mixture contains more than 25% by weight of one or more dielectrically neutral liquid crystalline, enantiotropic or monotropic, two-, three-, or four-ring compounds.

3. A system according to claim 1, wherein said liquid crystal mixture further contains more than 20% by weight of one or more dielectrically positive liquid crystalline, enantiotropic or monotropic, compounds containing three or more rings.

4. A system according to claim 1, wherein said liquid crystal mixture further contains one or more pleochroic dyes.

5. A system according to claim 1, wherein the amount of said dielectrically positive, liquid crystalline, enantiotropic or monotropic, two-ring compounds is not less than 1%.

6. A system according to claim 1, wherein said dielectrically positive, liquid crystalline two-ring compound are compounds of Formula I

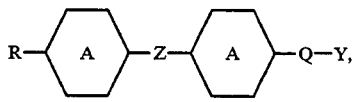

wherein:
R is an alkyl group with 1-15 C atoms, wherein one or more non-adjacent $CH_2$ groups can be replaced by —O—, —CO—, —COO—, —OCO—, —S— or —CH=CH=;

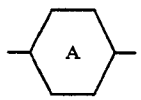

is Cyc, Phe, Phe.2F, Phe.3F, Phe.2F6F, Phe.2F3F6F, Pyr, Pyd or Dio;
Z is —$CH_2CH_2$—, —COO—, —OCO—, —C≡C— or a single bond;
Q is $CF_2$, $OCF_2$, $C_2F_4$, $OC_2F_4$ or a single bond; and
Y is H, Cl, F or CN.

7. A system according to claim 6, wherein the dielectrically positive two-ring component is based on carbonitriles in which O is a single bond and Y is CN, and the percentage of said two-ring component is 3-15% with respect to the total mass of the liquid crystal mixture.

8. A system according to claim 1, wherein said dielectrically positive two-ring component is based on SFM (super fluorinated materials) compounds, and the percentage of said two-ring component is 7.5-15% with respect to the total mass of the liquid crystal mixture.

9. A system according to claim 2, wherein said dielectrically neutral compounds are compounds of formula II

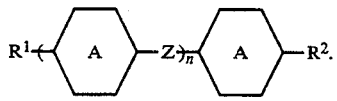

wherein:
$R^1$ and $R^2$ in each case independently of one another, are an alkyl group with 1-15 C atoms, wherein one or more non-adjacent $CH_2$ groups can be replaced by —O—, —CO—, —COO—, —OCO—, —S— or —CH=CH=;

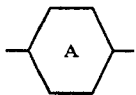

in each case independently of one another, are Cyc, Phe, Phe.2F, Phe.3F, Phe.2F6F, Phe.2F3F6F, Pyr, Pyd, or Dio;

Z is —$CH_2CH_2$—, —COO—, —OCO—, —C≡C— or a single bond; and
n is 1, 2 or 3.

10. A system according to claim 1, wherein said liquid crystal mixture further contains one or more dielectrically positive, liquid crystalline, enantiotropic or monotropic compounds having three or more rings selected from the group of compounds of formula III

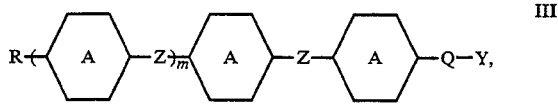

wherein:
R is an alkyl group with 1-15 C atoms, wherein one or more non-adjacent $CH_2$ groups can be replaced by —O—, —CO—, —COO—, —OCO—, —S— or —CH=CH=;

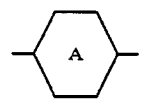

is Cyc, Phe, Phe.2F, Phe.3F, Phe.2F6F, Phe.2F3F6F, Pyr, Pyd or Dio;
Z is —$CH_2CH_2$—, —COO—, —OCO—, —C≡C— or a single bond;
m is 1 or 2;
Q is $CF_2$, $OCF_2$, $C_2F_4$, $OC_2F_4$ or a single bond; and
Y is H, Cl, F or CN.

11. A system according to claim 10, wherein the amount of said one or more dielectrically positive, liquid crystalline compounds having three or more rings is at least 20%.

12. A system according to claim 1, wherein the amount of said dielectrically positive, liquid crystalline, enantiotropic or monotropic, two-ring compounds is 3% or more.

13. A system according to claim 1, wherein said system is a network system.

14. A system according to claim 1, wherein said system is a microdroplet matrix system.

15. A system according to claim 1, wherein said transparent polymer medium has a structure between the structure of a network system and the structure of a microdroplet matrix system.

16. A system according to claim 1, wherein the thickness of the electrooptical system, d, is ≦2 mm.

17. A system according to claim 6, wherein said compounds of formula I are of the following formulae:
R-Cyc-Z-Cyc-Q-Y
R-Cyc-Z-Phe-Q-Y
R-Cyc-Z-Phe.2F-Q-Y
R-Cyc-Z-Phe.3F-Q-Y
R-Cyc-Z-Phe.2F6F-Q-Y
R-Cyc-Z-Phe.2F3F6F-Q-Y
R-Phe-Z-Phe-Q-Y
R-Phe.2F-Z-Phe-Q-Y
R-Phe.3F-Z-Phe-Q-Y
R-Phe.2F6F-Z-Phe-Q-Y
R-Phe.(F)-Z-Phe.(F)-Q-Y
R-Pyr-Z-Phe.(F)-CN
R-Pyd-Z-Phe.(F)-CN
wherein R is an alkyl group with 1–15 C atoms, wherein one or more non-adjacent $CH_2$ groups can be replaced by —O—, —CO—, —COO—, —OCO—, —S— or —CH=CH—;

Z is —$CH_2CH_2$—, —COO—, —OCO—, —C≡C— or a single bond;

Q is $CF_2$, $OCF_2$, $C_2F_4$, $OC_2F_4$ or a single bond; and Y is H, Cl, F or CN.

18. A system according to claim 17, wherein Z is —$CH_2CH_2$—, —COO—, —OCO— or a single bond.

19. A system according to claim 7, wherein said system contains at least one two-ring carbonitrile compound according to formula I, wherein R is an alkoxy group with 5 or more C atoms.

20. A system according to claim 8, wherein, in said SFM compounds, Q is $CF_2$, $OCF_2$, $C_2F_4$ or a single bond; and Y is Cl or F.

21. A system according to claim 8, wherein, in said SFM compounds, Q is $CF_2$, $OCF_2$ or $C_2F_4$; and Y is H.

22. A system according to claim 8, wherein, in said SFM compounds, Q-Y is F, Cl, $CF_3$ or $OCF_3$.

23. A system according to claim 1, wherein said liquid-crystalline mixture further contains 0.1–20 wt. %, based on the total weight of the liquid-crystalline mixture, of one or more pleochroic dyes.

24. A system according to claim 9, wherein said liquid crystal mixture further contains one or more dielectrically positive, liquid crystalline, enantiotropic or monotropic compounds having three or more rings selected from the group of compounds of formula III

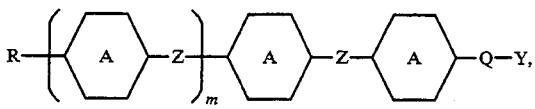

wherein
R is an alkyl group with 1–15 C atoms, wherein one or more non-adjacent $CH_2$ groups can be replaced by —O—, —CO—, —COO—, —OCO—, —S— or —CH=CH—;

is Cyc, Phe, Phe.2F, Phe.3F, Phe.2F6F, Phe.2F3F6F, Pyr, Pyd or Dio;

Z is —$CH_2CH_2$—, —COO—, —OCO—, —C≡C— or a single bond;

m is 1 or 2;

Q is $CF_2$, $OCF_2$, $C_2F_4$, $OC_2F_4$ or a single bond; and Y is H, Cl, F or CN.

25. A system according to claim 24, wherein the amount of said one or more dielectrically positive, liquid crystalline compounds having three or more rings is at least 20%.

* * * * *

UNITED STATES PATENT AND TRADEMARK OFFICE
CERTIFICATE OF CORRECTION

PATENT NO. : 5,376,302
DATED : December 27, 1994
INVENTOR(S) : David COATES et al.

It is certified that error appears in the above-indentified patent and that said Letters Patent is hereby corrected as shown below:

Claim 6, Column 15, line 19: Reads --- -CH=CH= ---

Should read - - -CH=CH- - - .

Claim 7, Column 15, line 34: Change "O" to -- Q --.

Signed and Sealed this

Second Day of May, 1995

Attest:

BRUCE LEHMAN

Attesting Officer    Commissioner of Patents and Trademarks